C. H. WARNER.
MEANS FOR ADJUSTING TACHOMETERS FOR TEMPERATURE COMPENSATION.
APPLICATION FILED MAY 22, 1911.

1,054,375.

Patented Feb. 25, 1913.

Witnesses:

Inventor
Charles H. Warner
By his Attorney

UNITED STATES PATENT OFFICE.

CHARLES H. WARNER, OF BELOIT, WISCONSIN, ASSIGNOR TO WARNER INSTRUMENT COMPANY, OF BELOIT, WISCONSIN, A CORPORATION OF ILLINOIS.

MEANS FOR ADJUSTING TACHOMETERS FOR TEMPERATURE COMPENSATION.

1,054,375.     Specification of Letters Patent.     Patented Feb. 25, 1913.

Application filed May 22, 1911. Serial No. 628,713.

*To all whom it may concern:*

Be it known that I, CHARLES H. WARNER, a citizen of the United States, residing at Beloit, county of Rock, State of Wisconsin, have made a certain new and useful Invention in Means for Adjusting Tachometers for Temperature Compensation.

The invention relates generally to devices of the class known as tachometers, and particularly, to speed indicating devices, such for instance, as are employed in connection with automobiles, to indicate their speed of travel.

The object of the invention is to provide means which are simple and efficient for automatically compensating instruments of the class referred to for temperature variations, whereby to secure accuracy of speed indications at different atmospheric temperatures, and more specifically stated the object is to provide simple and efficient means for automatically varying the strength of a rotating magnetic field, the influence of which is utilized to impart movements to the movable member of a scale and pointer mechanism or other indicating means.

Other objects of the invention will appear more fully hereinafter.

The invention consists substantially in the construction, combination, location and relative arrangement of parts, all as will be more fully hereinafter set forth, as shown in the accompanying drawing, and finally pointed out in the appended claims.

Figure 1:
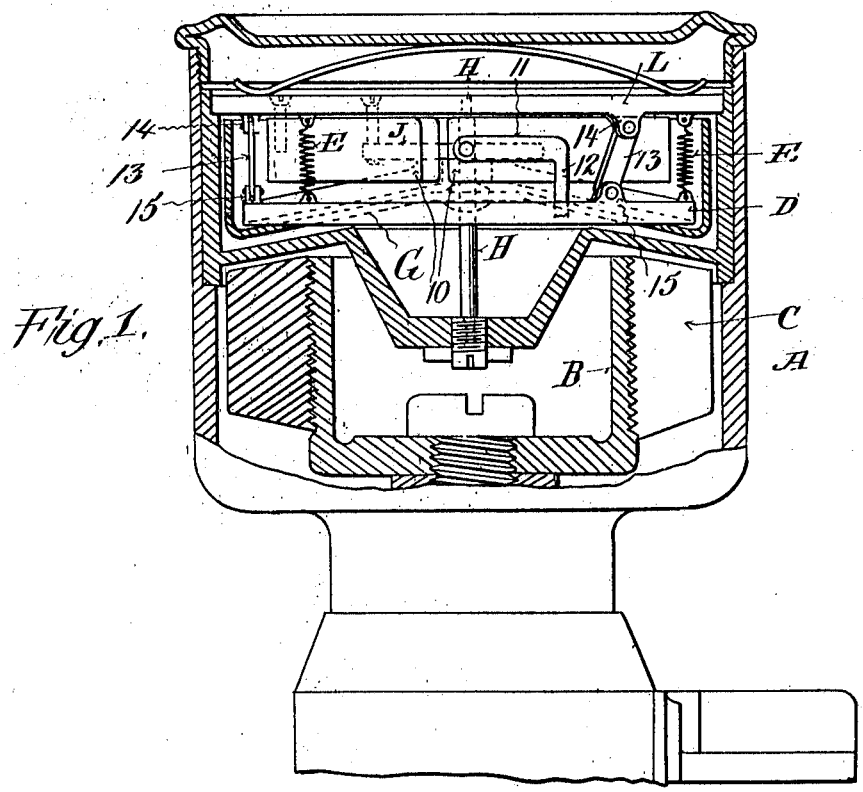
Figure 2:
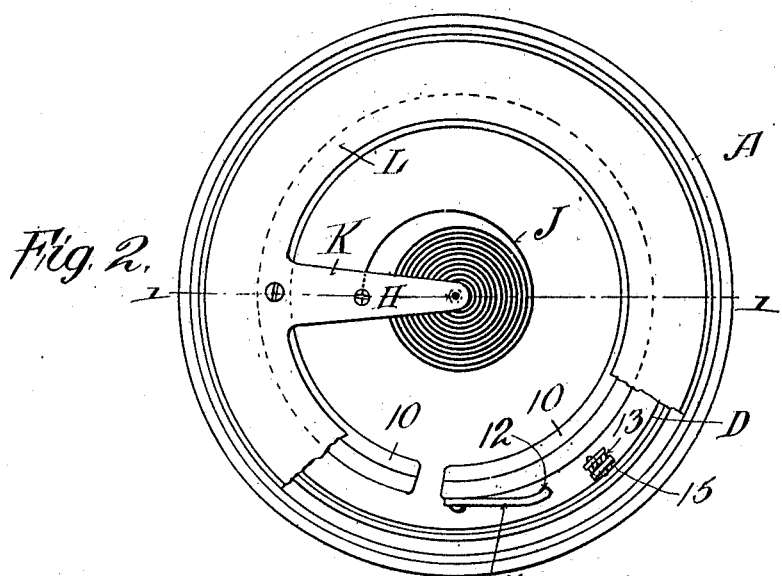

Referring to the accompanying drawing,—Figure 1 is a view partly in central longitudinal section, on the line 1—1, Fig. 2, parts broken out, showing a form of speed indicating device to which my invention is adapted, and showing the application thereto of a construction of atmospheric temperature variation compensating mechanism embodying my invention. Fig. 2 is a top plan view of the same, parts broken out and parts removed to more clearly disclose the construction and relation of parts.

In the manufacture of speed indicators it has been the custom to adjust the parts to give accurate readings thereof at a normal mean temperature. For ordinary purposes of use of instruments so adjusted this is usually sufficient since variations in indications due to changes in atmospheric temperature, from a mean temperature, are ordinarily quite small. It may sometimes however, be desirable, in order to secure greater accuracy, to make compensating adjustment for even the small variations of the indication of instruments of the class referred to, due to varying atmospheric conditions under which the instrument is used, whereby an absolutely accurate and correct indication is given at all temperatures. The automatic accomplishment of this result, in a simple and efficient manner, is among the special objects and purposes of my present invention.

In instruments of the class referred to the desired speed indications are made by means of an associated scale and pointer or hand, one of these parts usually being fixed and the other arranged to be displaced relatively thereto, and proportionally to the speed to be indicated, that is, said parts are usually arranged to be relatively displaced proportionally to the speed to be indicated. The displaceable or relatively displaceable member is ordinarily held yieldingly in an initial or "zero" position and is relatively displaced or moved from such initial position against the action of a hair or other spring. The means for effecting the rotative or relative displacement of the movable member of the scale and pointer mechanism may be varied throughout a wide range, and various constructions, mechanical, centrifugal, as well as magnetic, are at present on the market for accomplishing this result. I have shown my invention as applied to a speed indicator of the magnetic type, that is, of the type in which the movable element of the scale and pointer device is displaced by means of a rotating magnetic field. In the magnetic type of instrument the movable member of the scale and pointer device is ordinarily associated with a disk, cup or other convenient form of device or member, arranged within the influence of the rotating magnetic field, and is of such material as to be influenced and rotatively displaced against the action of a hair spring, by the magnetic drag exerted thereon of the rotating field. Various arrangements for producing the rotating magnet field, are embodied in instruments now on the market. While, therefore, I have shown and will now describe one form of means for accomplishing the desired results my invention, as defined in the claims, is not to be limited or restricted to this particular arrangement.

In carrying out my invention, I propose to employ a thermostatic or other device capable of being influenced by variations in atmospheric temperature, and to employ movements of the thermostatic device, due to variations in atmospheric temperature, to effect corresponding variations in the strength of the rotating magnetic field, and in proper relation to the variations in atmospheric temperature.

In the drawing A, designates a casing in which is mounted to rotate a carrier B, carrying a magnet C, rotation being imparted to the magnet carrier by suitable connections, and in the ordinary manner, with the shaft, or other part the speed of which is to be indicated. Coöperating with the magnet is a member D, which is of magnetic material and which constitutes a magnetic mass or field ring, the function of which is to concentrate the lines of force in the magnetic field or air-gap space between the same and the magnet. In the form shown, the member D, is supported for movement bodily toward and from the rotating magnet C. The member D, is arranged within the casing A, and is suspended therein by means of springs E, or other yielding supports, and interposed between the magnet C, and the mass D, or in such relation thereto as to be influenced by the lines of force of the magnetic field maintained between said magnet and mass, is a member G, carried by a spindle H, journaled in suitable bearings, and which member G, in the present instance, constitutes the rotative or movable part of the scale and pointer mechanism of the instrument. This movable scale member G, is normally held in an initial or "zero" position by means of a hair spring J, which is connected at one end to the spindle H and at the other end to a fixed arm K, forming part of a ring L, stationarily mounted within the casing. The spring is so connected with reference to the spindle H as to yieldingly resist the rotative movement in one direction of the spindle.

Arranged within the casing is a thermostatic device indicated at 10, that is, a device which is sensitive to temperature variations, and which, in the particular construction shown, comprises a thermopile consisting of associated split rings of metals having different heat coefficients or different expansive characteristics. This thermostatic device is arranged in such relation that the ends thereof approach or recede from each other under the action of variations in atmospheric temperatures. Connected to move with the thermostatic device, when so moved under variations of atmospheric temperature, is an arm 11, having at its free end a pin 12, arranged to be received in a recess in the field ring D. As shown, the arm 11, extends in substantially tangential relation to the circle of the thermostatic device, and consequently under the influence of the movements thereof, imparted through variations in atmospheric temperature, the field ring or magnet mass D, is shifted rotatively or in angular direction relative to the geometric axis thereof. The spring supports E, for this field ring or mass permits such shifting movement thereof. Links 13, are pivotally connected at their respective ends to ears 14, 15, respectively formed on the supporting ring L, and the field ring or mass D. Normally these arms or links 13 occupy vertically inclined positions, that is, the pivots of their upper ends are out of vertical line, normally with the pivots of their lower ends. The supporting ring L, being fixed and the field ring or mass D, being shifted rotarily about its geometric axis, it will be readily seen that as the magnetic mass or ring D, is thus axially shifted the tendency is for the links 13, to assume a position at right angles to the plane of the supporting ring L, that is, for a line joining the pivots of the respective ends thereof to approach or recede from right angular relation to the plane of said ring L. The result of this action is for the field ring or disk D to be shifted automatically toward and from the magnet C, the bodily shifting movement of said ring toward the magnet C, being yieldingly resisted by the springs E. In the manner above described the strength of the rotating magnetic field is automatically varied in accordance with variations in atmospheric temperature.

While I have shown and described my invention as applied to an automobile speed indicating device, I do not desire to be limited or restricted in respect to this particular use thereof, as it is obvious that my invention may be equally well adapted for use in connection with instruments used for other purposes.

Having now set forth the object and nature of my invention and a construction embodying the principles thereof, what I claim as new and useful and of my own invention and desire to secure by Letters Patent is:—

1. In a tachometer, the combination with means for creating a concentrated rotating magnetic field, a member arranged within the influence of said field to be displaced thereby, a thermostatic device, means for connecting said thermostatic device to one of the members of the concentrated field creating means to shift the same rotatively according to variations in atmospheric temperature, and, a link connected to said rotatively displaceable member and operating to shift the same, when rotatively displaced, to vary the strength of the rotating magnetic field.

2. In a tachometer the combination with means for creating a concentrated rotating magnetic field, a member arranged within the influence of said field to be displaced thereby, a thermostatic device, means for connecting said device to one of the members in the rotating field creating means, to shift the same rotatively according to variations in temperature, and a pivoted link connected to said rotatively displaceable member and operating to move the same, when rotatively displaced, in a direction to vary the strength of the magnetic field.

3. In a tachometer the combination with means for creating a concentrated magnetic field including a rotatable magnet and a magnetic mass, a member arranged within the influence of said field to be displaced thereby, said mass being mounted for rotative and lateral shifting movements, a link pivotally connected to said mass and a thermostatic device, connecting means between said device and said mass to rotatively displace the same according to variations in atmospheric temperature.

4. In a tachometer the combination with means for creating a concentrated magnetic field including a rotatable magnet and a rotating magnetic mass, a scale member arranged within the influence of said field to be rotatively displaced thereby, a supporting member, means for supporting said mass therefrom for movement toward and from the magnet and also for axial rotative movement, a thermostatic device, means connecting said device to said mass for rotatively displacing the same according to atmospheric variations, and links respectively connected pivotally to said mass and supporting member.

In testimony whereof I have hereunto set my hand in the presence of the subscribing witnesses, on this 25th day of April A. D., 1911.

CHARLES H. WARNER.

Witnesses:
　H. W. ADAMS,
　EDWARD M. THOMPSON.